United States Patent Office.

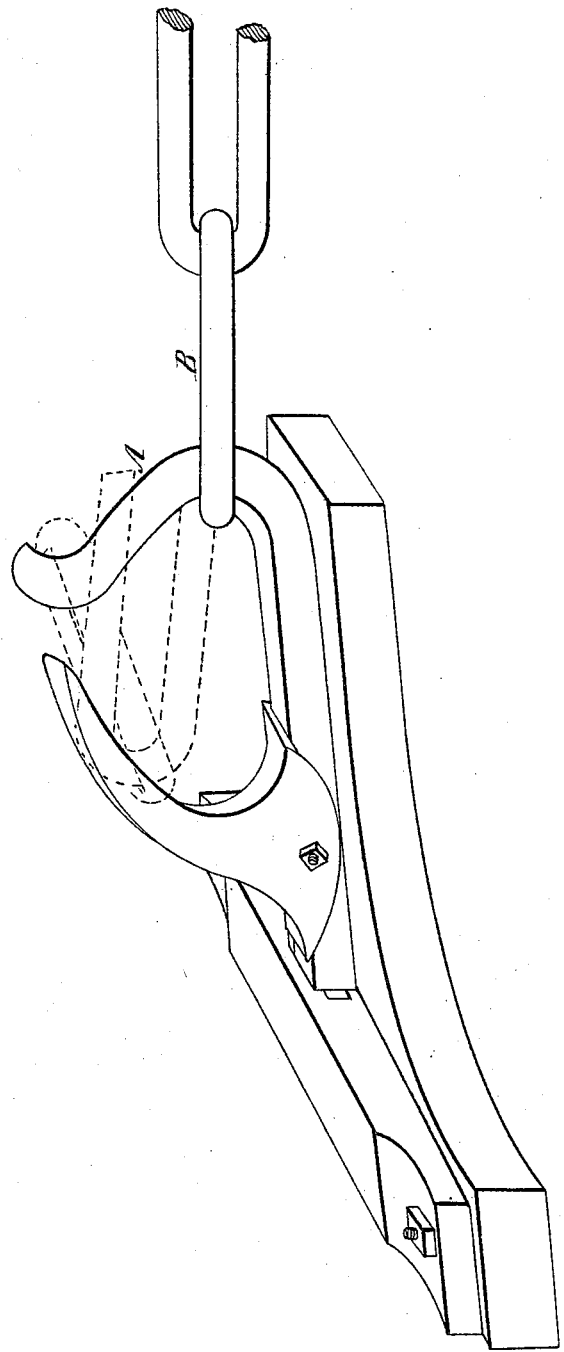

JOHN KELLY, OF WOODBERRY, MARYLAND.

Letters Patent No. 60,741, dated January 1, 1867.

IMPROVED CAR COUPLING.

The Schedule referred to in these Letters Patent and making part of the same.

TO ALL WHOM IT MAY CONCERN:

Be it known that I, JOHN KELLY, of Woodberry, in the county of Baltimore, and State of Maryland, have invented a new and improved Car Coupling; and I do hereby declare the following to be a full, clear, and exact description of the same, sufficient to enable one skilled in the art to which the invention appertains to make use of it, reference being had to the accompanying drawings, which form a part of this specification, and in which my invention is represented by a side elevation.

This coupling is principally designed for freight, coal, and other burden cars, in which the adjacent cars are attached by links, one or more, which engage with hooks projecting from the ends of the car. The improvement consists of a prong so attached to the shank of the hook as to prevent the accidental uncoupling by the bouncing of the link out of the hook, in the frequent jars and jerks to which the cars and couplings are exposed.

In the drawings, A is the wrought-iron hook which is presented at the end of the car, to be caught by the link B, of the coupling-chain, whereby it is attached to the engine tender or another car. The hook is not intended to withstand the force of the concussion, but bumpers or fenders are provided at another part to withstand these shocks. The prong C may be forged upon the shank of the hook A, but as it is not subjected to actual strain, I prefer to make it of cast iron and attach it by flanges and rivet, or screw, to the shank of the hook. Sudden jerks on the link, or concussions of the cars, will tend to jerk and push the link so that it may fall from its connection with the hook, and leave the car uncoupled; in such cases the prong C arrests the link and maintains its connection with the hook.

Having described my invention, what I claim as new, and desire to secure by Letters Patent, is—

The wrought-iron hook A, provided with a prong C, arranged to act upon the coupling as described.

To the above specification of my improvement in car couplings I have signed my hand this fifteenth day of October, 1866.

JOHN KELLY.

Witnesses:
SOLON C. KEMON,
GEORGE W. ROTHWELL.